March 27, 1945.  H. C. TRICH  2,372,408
PRESSURE SNUBBER
Filed Feb. 15, 1943
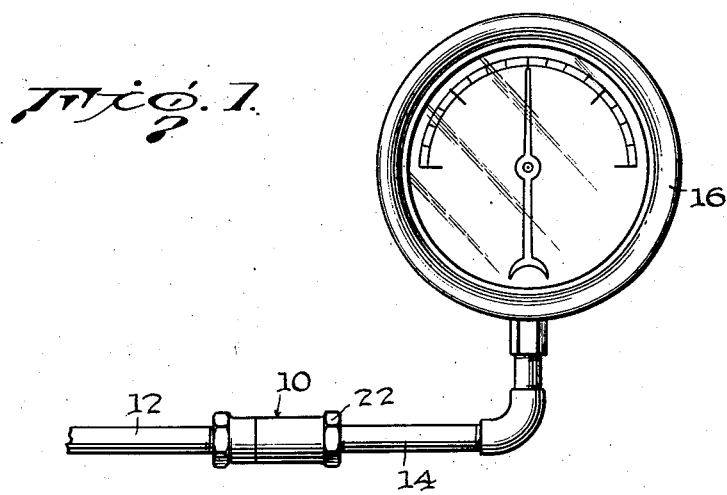
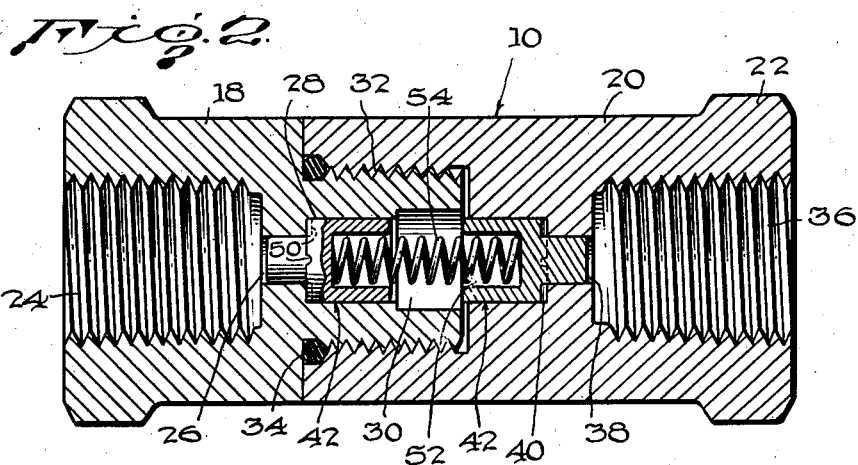
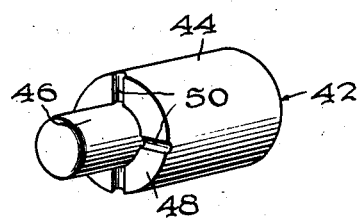
Inventor
HENRY C. TRICH Patented Mar. 27, 1945

2,372,408

UNITED STATES PATENT OFFICE 2,372,408

PRESSURE SNUBBER

Henry C. Trich, Chicago, Ill., assignor to Hoof Products Company, Chicago, Ill., a corporation of Illinois Application February 15, 1943, Serial No. 475,975

6 Claims. (Cl. 138—40)

The present invention relates to a hydraulic safety or control device and is more particularly concerned with the prevention of high pressure surges sometimes occurring in hydraulic lines and capable of damaging sensitive instrumentalities.

More specifically the invention contemplates provision of a device for resisting suddenly applied hydraulic shock loads which, due to the incompressibility of hydraulic fluids create an impact capable of damaging delicate mechanisms in communication therewith. The invention is, however, not so limited and is useful generally in fluid systems employing either a compressible or incompressible fluid subject to momentary surges. The use of a restricted orifice in a line leading to the relatively sensitive instrumentality is not usually satisfactory since the instantaneous pressure caused by line surges or shock loads may be quite high and further because of the fact that adequately restricted passages may tend to become clogged. Various protective piston constructions have been proposed but even small movements of the piston to operative position, particularly in systems employing incompressible fluids, will transmit a corresponding relative volume flow which may be quite excessive for many pressure responsive instrumentalities now employed. For example in the "Bourdon tube" type of pressure gage the fluid volume required for actuation is quite small and even the most restricted fluid flows required to actuate hitherto known protective acting devices is sufficient to seriously damage the unit.

It is accordingly an important object achieved by the present invention to provide a protective device which is continuously operative to throttle or restrict flow and to cushion line surges without clogging and without permitting an uncontrolled transmission of fluid.

Other objects achieved by the present invention are the provision of a surge restricting construction as above which is self-cleaning in action and thus capable of affording a predetermined degree of fluid restriction over substantial periods of use; the provision of a device as above wherein hydraulic shock loads are resisted by combined restriction of fluid flow and application of yieldable mechanical resistance; provision of such a fluid shock absorbing unit which is operable equally well regardless of the direction of flow and thus incapable of being improperly disposed during assembly.

Yet other and further objects will be apparent from a consideration of the following specification and the drawings, wherein Fig. 1 illustrates a shock absorbing unit constructed in accordance with the principles of the present invention and arranged within a hydraulic line leading to a pressure gage;

Fig. 2 is a sectional view taken centrally through the shock absorbing unit of Fig. 1; and Fig. 3 is a perspective view of one of the shiftable plungers shown in Fig. 2.

The fluid impact absorbing device shown in Figs. 1 and 2 for the purpose of illustrating one preferred embodiment of the present invention is designated by the numeral 10 and, as shown in Fig. 1, may be disposed in a line comprising an inlet conduit 12 and an outlet 14 leading to a pressure gage 16.

The unit, as shown more clearly in Fig. 2, comprises a body portion composed of two co-axial sections 18 and 20. These sections are more or less cylindrical in configuration with hexagonal outer extremities 22 for reception of a wrench. The lefthandmost section 18 as viewed in Fig. 2 is internally threaded as at 24 to receive the conduit 12 and the threaded passageway communicates with a relatively small bore or passageway 26 terminating in a larger bore or passageway 28 which in turn extends into and communicates with a central chamber 30.

The two sections 18 and 20 are threadedly engaged as at 32 and suitable packing means 34 permits assembly in hermetically sealed relationship.

The body section 20 is internally threaded at 36 to receive the extremity of conduit 14 and provided with a relatively small bore or passageway 38 and an enlarged bore 40 similarly communicating with the central chamber 30 when the parts are assembled as shown. The construction and proportioning of the internal passageways is such as to form guideways receiving a pair of oppositely facing co-axially disposed plungers 42 appearing in somewhat enlarged detail in Fig. 3. The main body portion 44 of these plungers assumes a cylindrical configuration conforming with and complementary to the associated bore or passageway 28 or 40, sufficient clearance being afforded to permit axial sliding movement as well as restricted axial flow of fluid thereabout. An axial projection or pin 46 extending from one extremity of the plunger is insertable into either of passages 26 or 38 in order to occupy and restrict these passages in substantially the same manner, when in the positions shown.

As stated above, fluid leakage or restricted flow may occur between the circumferential surfaces of the plunger and the complementary adjacent walls of the embracing passageway. The degree of flow restriction may be predetermined in accordance with the clearance provided. In order, however, to prevent sudden hydraulic impact from urging the plunger against the shouldered portion of the passageways in sealing relation, the annular ring-like seat or surface 48 is provided with a series of radial grooves 50. It will be appreciated, however, that these grooves, as shown, are more or less diagrammatical and their number and configuration may be varied materially, depending upon the degree of restriction required.

As shown more clearly in Fig. 2 each of the plungers 42 is relieved from one axial extremity, as at 52, to provide a seat for a helical coil spring 54, acting in compression for holding the two plungers in the respective positions shown against the shouldered portion of the passageways.

With the shock absorbing unit disposed in the line as indicated in Fig. 1, the operation of the device is as follows: a sudden incoming surge of hydraulic fluid in the conduit 12 acts against the lefthandmost plunger 42, tending to urge it to the right. This force, however, is resisted by the action of the compression spring 54 as well as the resistance to fluid flow through the restricted passages existing about the outlet plunger. In short, with the central chamber completely full of incompressible fluid, it will be apparent that the inlet plunger cannot move inwardly except in accordance with the restricted outflow permitted about the outlet plunger. At the same time the "build up" in spring pressure tends to further resist movement of the inlet plunger and compensates in part for the applied pressure at the inlet. During this time restricted fluid flow proceeds about the lefthandmost plunger and into the central chamber and thence about the other plunger to the outlet line 14. When limiting conditions have been reached it will be apparent that this flow about the first plunger continues, to permit the member to gradually return to its normal position against the inlet shoulder under the influence of the spring pressure. This action, occupying a short period of time, will be effective to absorb sudden hydraulic shock and prevent damage to the gage.

It will be apparent from the foregoing that the device operates equally as well to retard return flow of the pressure from the gage when the line pressure is lowered. In this case the line 14 becomes the inlet line and the conduit 12 the outlet.

Advantageously the device before being placed in service may be charged or filled internally with a body of the fluid prevailing in the fluid lines. Thus when employed in hydraulic systems the device is advantageously first charged with hydraulic liquid. The invention is not limited however to use in liquid systems and affords the same valuable advantages when employed within fluid systems of all types, being readily adaptable for functioning with air, gas or steam, as well as water and oil.

From the foregoing it will be apparent that the present invention provides a fluid shock resisting device which is completely effective to prevent transmission of sudden impact and which is operative continuously to throttle the shock over a sufficient period of time to prevent damage to sensitive instrumentalities. It should be noted, moreover, that in accordance with the invention the restricted passages are self-cleaning in that the opposing parts are relatively movable to prevent accumulation of foreign matter. Sticking or freezing is thus largely inhibited. Devices constructed in accordance with the present invention obviously operate equally well in both directions of flow. The device moreover provides for the partial absorption of fluid impact by increasing spring resistance. Thus movement of the inlet plunger away from its seat against the action of spring 54 permits the maintenance of a higher instantaneous pressure differential between the inlet and the central chamber 30 than would be present if the spring were omitted. In the latter case the internal body of fluid would transmit a fluid pressure identical with that at the inlet. By the use of spring 54 however the inlet plunger assumes an instantaneous position such that the inlet pressure is balanced by an internal pressure, lower by an amount corresponding to the effective spring pressure. This assures an effective damping or "dash-pot" action whereby internal pressures in the chamber 30 tend to be materially lower than sharply increasing inlet pressures. By reason of this effect the operation of the outlet plunger as a flow restriction device occurs under an appreciably modified pressure differential, substantially lower than that corresponding to the high instantaneous inlet pressure prevailing. It will be understood from the foregoing that the spring 54 may be selected to suit any widely varying conditions of prospective service. It is to be further noted that regardless of direction in which fluid impact is applied, the outlet plunger is in maximum flow restricting position, against the shoulder formed by the juncture between the passages 26 and 28 for instance. In short the plunger is normally in a limiting position such that it cannot move further toward the direction of outflow, and thus is incapable of mechanically transmitting fluid impact to the outlet. Accordingly it acts solely as a flow restriction means while the opposite plunger yields, if necessary, to absorb a portion of the shock as noted above. In no way however is it possible for fluid to be transmitted through the device except by restricted flow past one of the plungers while in limiting, maximum flow-resisting position.

It is to be understood that while the present drawings exemplify a preferred embodiment of the present invention for purposes of illustrating the principles thereof, obviously the invention is not so limited but is capable of further modifications and changes without departing from the spirit and scope of the disclosure.

What I claim is:

1. A fluid shock absorbing unit comprising a chamber having an inlet and outlet for interposition within a fluid conduit, plunger means and seating means therefor within said chamber between said inlet and outlet, yieldable means normally urging said plunger to limiting position adjacent the outlet, said plunger being shiftable away from the outlet against said yieldable means, and means between the said plunger means and said seating means to provide a non-closing restricted fluid passageway between the outer surface of said plunger and the walls of the chamber to connect the inlet and outlet.

2. In a fluid shock absorbing device of the character described, a chamber having a spaced inlet and an outlet, said chamber comprising a guideway conduit disposed between said inlet and an outlet, plunger seating means at the inlet and outlet, a plunger shiftably disposed within said guideway and having sufficient clearance from the chamber wall and the said seating means to permit at all times a restricted fluid flow to connect the inlet and outlet, and resilient means normally urging said plunger to said seating means at the outlet.

3. In a fluid shock absorbing device of the class described, a chamber having a spaced inlet and outlet, plunger seating means at the inlet and outlet, a pair of independently movable plungers in the chamber between the inlet and outlet, and means between said plungers and said seating means to provide a non-closing restricted fluid passage between the outer surfaces of the plungers and the walls of the chamber to connect the inlet and outlet.

4. A fluid shock absorbing unit comprising a chambered casing having an inlet and an outlet, plunger seating means at an outlet, surge responsive plunger means shiftable in the casing chamber, said plunger means having clearance from the chamber wall and provided with fluid passages at its end to provide a restricted passageway between its outer surface and the walls of the chamber and the seating means to connect at all times the inlet and the outlet, and yieldable means normally to urge said plunger means to a position against said seating means.

5. A fluid shock absorbing device comprising a chambered casing having spaced and opposed inlet and outlet; plunger seating means at said inlet and outlet; a pair of independent surge responsive plungers shiftable in the casing chamber, said plungers having clearance from the wall of the chamber and the seating means to provide at all times a non-closing restricted fluid passageway between inlet and outlet, and a spring between said plungers to urge them to positions against said seating means.

6. A fluid shock absorbing unit comprising separable members providing a through fluid passage and forming between them a plunger chamber, said chamber having spaced opposed inlet and outlet, plunger seating means at said inlet and outlet, a pair of oppositely disposed plungers in the chamber to engage said seating means at the inlet and outlet, said plungers having clearance space between a wall of the chamber and in said seating means to provide at all times non-closing restricted fluid passageways between inlet and outlet, and a spring between said plungers normally to urge them against said seating means.

HENRY C. TRICH.